Patented Nov. 17, 1936

2,061,377

UNITED STATES PATENT OFFICE 2,061,377

CONVERSION OF POLYHALOGENATED ALCOHOLS

Herbert P. A. Groll, Oakland, and George Hearne, Berkeley, Calif., assignors to Shell Development Company, San Francisco, Calif., a corporation of Delaware No Drawing. Application June 25, 1934, Serial No. 732,302

22 Claims. (Cl. 260—156.5)

This invention relates to a novel process for the conversion of polyhalogenated alcohols containing an excess of halogen atoms over hydroxyl groups to valuable halogenated epoxy compounds and/or hydroxy compounds with fewer or no halogen atoms which comprises reacting such a polyhalogenated alcohol with a basic or basic reacting compound.

Another object of this invention is to provide certain new and useful halogenated epoxides as well as certain non-halogenated polyhydric alcohols and a method of preparing the same.

The polyhalogenated alcohols which are contemplated may be divided into two subgroups. One group consists of polyhydric alcohols containing a greater number of halogen atoms than hydroxyl groups, while the other group consists of monohydric alcohols containing at least one tertiary carbon atom and a plurality of halogen atoms.

The polyhalogenated polyhydric alcohols which may be treated by our method may be of alkyl, aralkyl or alicyclic character. They possess a plurality of halogen atoms and a plurality of hydroxyl groups, with the former being in excess of the latter. The hydroxyl groups may be linked to carbon atoms of primary, secondary and/or tertiary character. It is to be understood that the polyhalogenated polyhydric alcohol may be of mixed character, that is, a single alcohol may contain primary, secondary and tertiary carbinol groups. The halogen atoms may or may not be linked to carbon atoms vicinal to carbinol groups.

When executing our invention with polyhalogenated monohydric alcohols, we prefer to treat only those polyhalogenated monohydric alcohols containing a tertiary carbon atom, preferably a tertiary carbinol group. A preferred group of polyhalogenated monohydric alcohols includes those embracing the group

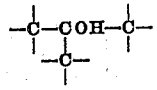

wherein the loose bonds may be taken up by hydrogen, halogen, alkyl, alkoxy, carbocyclic, heterocyclic, aralkyl, aralkoxy and/or aryloxy groups which may or may not be further substituted, or the loose bonds may be taken up by any suitable organic radical or monovalent substituent. It will be understood that the compound treated will possess a plurality of halogen atoms which may or may not be linked to carbon atoms vicinal to the tertiary carbinol group. One or a plurality of halogen atoms may be linked to the same carbon atom. In general, we prefer to employ those polyhalogenated monohydric alcohols wherein no more than two halogen atoms are linked to the same carbon atom.

The following list of suitable polyhalogenated alcohols, includes those polyhydric alcohols containing a greater number of halogen atoms than hydroxyl groups, as well as those polyhalogenated monohydric alcohols containing a tertiary carbon atom:

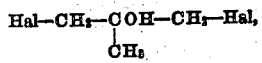
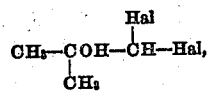
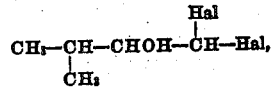
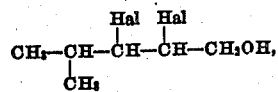
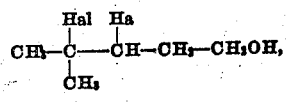
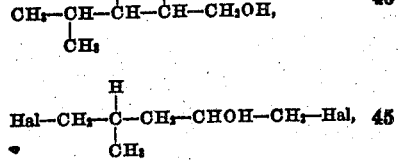
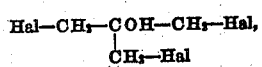
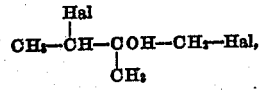
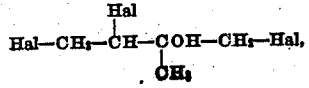
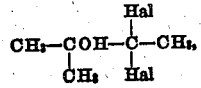

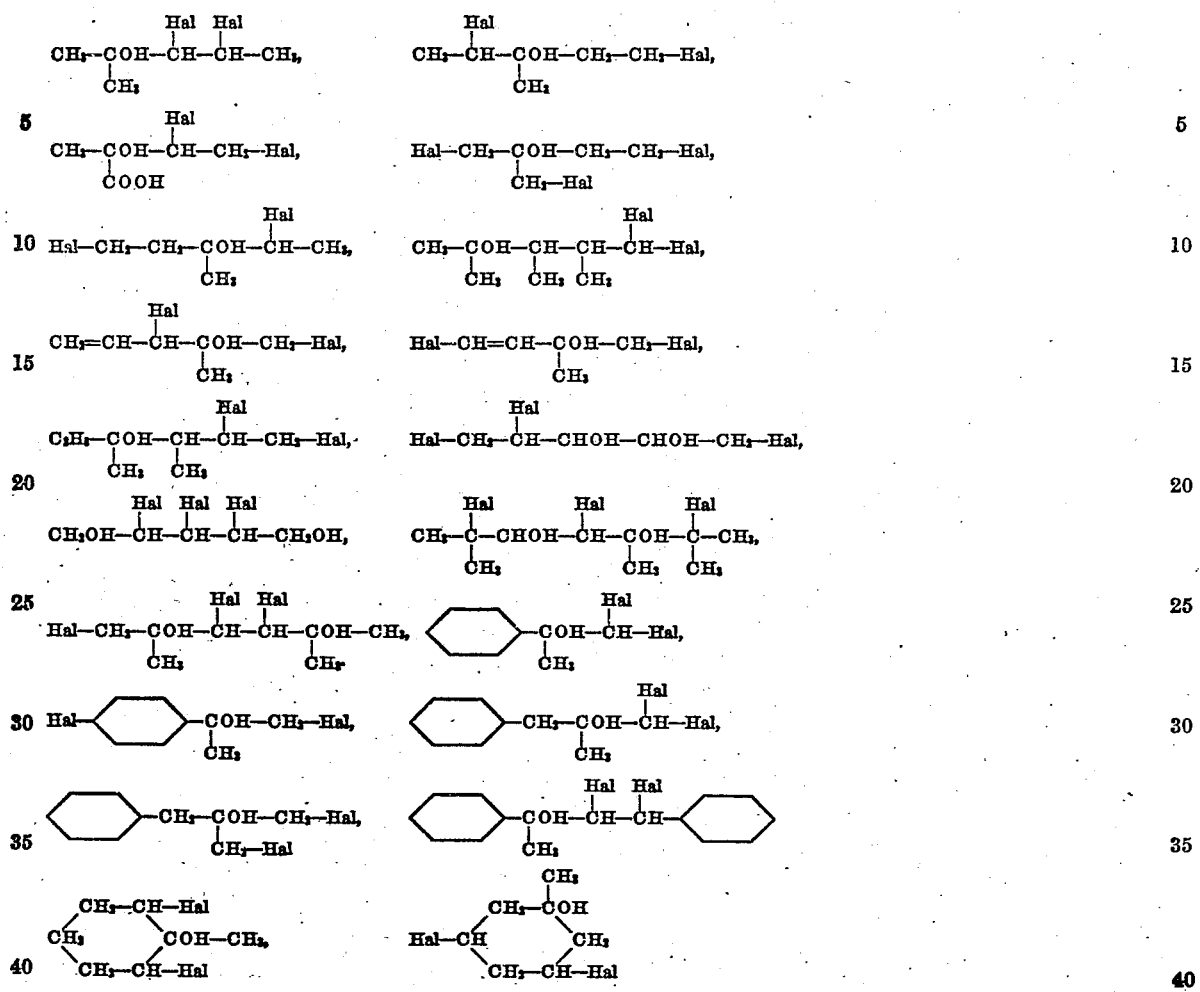

and the like as well as their homologues, analogues and suitable substitution products.

Our invention is preferably executed employing a basic or basic reacting compound of the class consisting of basic metal oxides, hydroxides, carbonates, bicarbonates and borates, as well as other basic reacting metal salts of strong bases and weak acids. Particularly suitable compounds are the alkali- and alkaline-earth metal oxides, hydroxides, bicarbonates and borates as well as the alkali metal carbonates. Other suitable basic compounds are the metal hydroxides such as $Al(OH)_3$, $Cu(OH)_2$, $Mg(OH)_2$, $Ni(OH)_2$, $Fe(OH)_3$, $Ni(OH)_3$, $Co(OH)_3$, $Pb(OH)_2$ and the like as well as the basic oxides such as $PbO$, $Pb_3O_4$, $PbO_2$, $Mn_2O_3$, etc. In some cases, we may advantageously employ the basic reacting ammonium compounds such as $NH_4OH$, $NH_4HCO_3$, $(NH_4)_2CO_3$, $NH_4BO_4$, $(NH_4)_2B_2O_7$ and the like, although the employment of basic ammonium compounds may result in the formation of amino compounds such as glycamines, etc. In those cases where it may be desirable, suitable organic basic or basic reacting compounds such as the amines, hydroxylamines, pyridine and its homologues and the like as well as the metal alcoholates may be advantageously employed.

The basic compounds are preferably applied as aqueous solutions or suspensions; however, in some instances when substantially only a halogenated epoxide is desired as the reaction product, and particularly when certain polyhalogenated monohydric tertiary alcohols are treated, it may be desirable, due to the readiness with which the resulting halogenated epoxide is hydrolyzed and/or hydrated, to preclude the presence of water. In such cases, we may employ an alkali- or alkaline-earth metal hydroxide in the initial absence of water. For example, the solid metal hydroxide may be applied to an excess of the polyhalogenated alcohol or to the polyhalogenated alcohol dissolved or suspended in a suitable inert organic solvent such as an ether, alcohol, hydrocarbon and the like or a metal alcoholate per se may be added.

The primary reaction which probably occurs when a polyhalogenated alcohol which contains an excess of halogen atoms over hydroxyl groups is treated in accordance with the principles of the present invention, may, for purposes of illustration, be represented by the specific equation assumed for the reaction of dichloro tertiary butyl alcohol with sodium hydroxide.

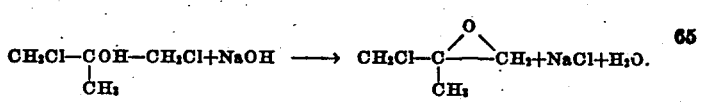

In this specific case, the primary reaction results in the formation of a halogenated monoepoxide which may be designated as methyl epichlorhydrin. If the polyhalogenated alcohol possesses a plurality of hydroxyl groups and halogen atoms in excess of the hydroxyl groups, the primary reaction product will usually be a halogenated polyepoxide which may or may not embrace a tertiary carbon atom depending on the specific polyhalogenated polyhydric alcohols reacted. The primary reaction product of a polyhalogenated monohydric alcohol will be characterized by possessing a single epoxy group and at least one tertiary carbon atom.

In general, regardless of which subgroup in which the treated polyhalogenated alcohol may be classified, the primary reaction results in the formation of a halogenated epoxy compound. To obtain substantially only a halogenated epoxide as the reaction product, the primary reaction is executed at a temperature preferably below about 100° C. In addition, it is desirable to prevent the hydrolysis and hydration of the intermediately formed halogenated epoxide by reducing its time of contact with the aqueous reaction mixture to a minimum. This object may be best achieved by effecting the removal of the halogenated epoxide from the reaction mixture substantially as soon as it is formed therein. This removal may be effected in a wide variety of suitable manners. In a great majority of cases, we may execute the primary reaction in a suitable apparatus and under such conditions of temperature and pressure therein that the halogenated epoxide may be distilled from the reaction mixture continuously and at such a rate that its substantial accumulation in the system is obviated. For example, we may operate at a temperature above the atmospheric boiling temperature of the resulting halogenated epoxide or its azeotropic mixture with water or other vaporizable constituents of the reaction mixture provided said boiling temperature is below about 100° C. If said boiling temperature is above the optimum temperature of operation, we may operate with the system under a subatmospheric pressure. The temperature of the reaction mixture and pressure on the system may be adjusted until the reaction proceeds rapidly under optimum conditions while the halogenated epoxide is distilled from the system substantially as soon as it is formed therein.

While in contact with the alkaline reaction mixture, the rate of hydration of the halogenated epoxides is, within certain limits, dependent on the hydroxyl ion concentration of the reaction mixture. The primary reaction to obtain substantially only a halogenated epoxide is therefore effected at a hydroxyl ion concentration at which the latter's effect on its hydration is inconsiderable. We have observed that, in general, as the temperature of the reaction mixture is increased, the maximum hydrolytic activity of the hydroxyl ions is shifted toward lower concentrations.

It will be evident that if our invention is executed in accordance with the above described conditions under which the substantial hydrolysis and hydration of the primary reaction product is avoided, we may obtain substantially only a halogenated epoxide.

Alternatively, we may execute our invention in such a manner that, under the condition of its formation and in the presence of water, the halogenated epoxide is unstable resulting in the formation of non-halogenated and/or less halogenated hydroxy compounds. These hydroxy compounds, which are polyhydric alcohols and in some cases hydroxy-carbonylic compounds, may be considered as the hydrolysis and hydration products of the primarily formed halogenated epoxides. For purposes of illustration, the reactions which we assume to occur may be represented by the specific equations for the treatment of dichloro tertiary butyl alcohol with an aqueous solution of sodium hydroxide. As previously illustrated, the primary reaction may be represented by the following equation:

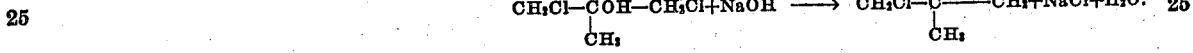

The reaction to form the corresponding non-halogenated polyhydric alcohol may occur as follows. At operation temperatures above about 100° C. and preferably in a range of from 120° C. to 150° C., and on sufficient contact time of the halogenated epoxide with the aqueous alkaline reaction mixture, the halogenated epoxide may be hydrated and subsequently hydrolyzed to the corresponding non-halogenated polyhydric alcohol in accordance with the equations

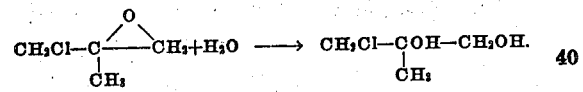

The β-methyl glycerine monochlorhydrin thus formed by hydration is, under the conditions of its formation and in the presence of NaOH, hydrolyzed to β-methyl glycerol as follows:

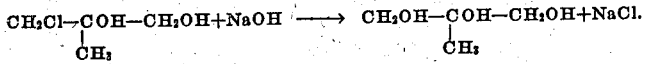

The above reaction may proceed via glycidol formation according to the mechanism:

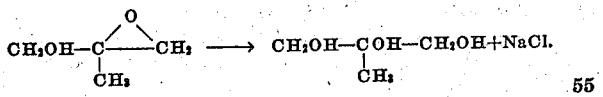

When saturated polyhalogenated alcohols are treated and saturated halogenated epoxides are obtained, the hydration of said halogenated epoxide results in the formation of a non-halogenated polyhydric alcohol or non-halogenated hydroxy-carbonylic compound. If, however, the treated polyhalogenated alcohol is unsaturated and possesses a halogen atom linked to an unsaturated carbon atom, we may stop the reaction when only the epoxy group or groups has or have been hydrated and the corresponding halogenated polyhydric alcohol may be obtained.

When treating saturated polyhalogenated alcohols we may execute our invention so that substantially only non-halogenated hydroxy compounds are obtained. This object is achieved by treating the polyhalogenated alcohol with a basic or basic reacting compound in the presence of water under conditions at which the intermediately formed halogenated mono- or polyepoxide is unstable. A suitable temperature of operation is in the range of from about 120° C. to 150° C., although in some cases temperatures lower than 120° C. and higher than 150° C. may be advantageously employed. The reaction is effected in the presence of water. If the intermediately formed epoxide is not hydrated and hydrolyzed substantially as soon as it is formed, its contact with the reaction mixture may be prolonged until the desired degree of conversion to the desired reaction product is effected.

If the polyhalogenated alcohol treated possesses two halogen atoms linked to a single carbon atom, the primary reaction may result in the formation of a halogenated epoxide wherein a halogen atom is linked to a carbon atom which is in turn linked to an epoxy oxygen atom. The primary reaction resulting in this type of compound may be illustrated by the equation of the specific reaction of 1,1-dibrom-2-methyl-propanol-2 with sodium hydroxide

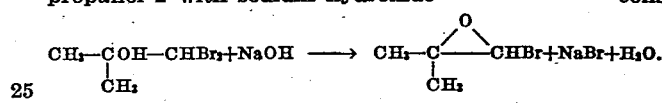

However, in some cases we find it difficult to isolate such a halogenated epoxide due to the fact that under the conditions of its formation the following probable reaction is favored

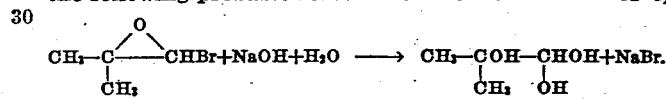

The polyhydroxy compound possessing two hydroxyl groups linked to the same carbon atom is unstable, consequently, it is rapidly decomposed as follows:

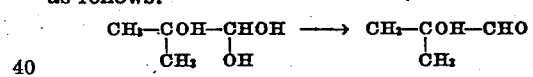

resulting in the formation of an hydroxy-aldehyde. The final reaction product is an hydroxy-carbonylic compound which may be aldehydic or ketonic in character, depending on whether the dihalogenated carbon atom entering into the reaction whereby it will be linked to an epoxy carbon atom is, respectively, of primary or secondary character. When a polyhalogenated alcohol capable of forming such a halogenated epoxide is treated, we may directly form a hydroxy-carbonylic compound under conditions which ordinarily favor the formation of a stable epoxy compound.

It will be evident that our invention may be executed in a wide variety of manners and that its successful operation is not dependent on any specific apparatus or mode of operation of the same. When a halogenated epoxide is desired as the main reaction product, we prefer to conduct the reaction in a suitable reaction vessel equipped with heating and cooling means as well as means for effecting agitation of its contents, and in communication with a suitable fractionating apparatus by means of which the halogenated epoxide formed may be removed from the system at the desired rate. The polyhalogenated alcohol and basic or basic reacting compound are preferably contacted in the reaction vessel. The basic or basic reacting compound is applied in an amount equivalent to or in slight excess of the amount of hydrogen halide to be removed from the polyhalogenated alcohol in the course of the reaction to form the halogenated epoxide. If the object of the invention is to prepare halogenated epoxides, it is essential that the reaction proceed under alkaline conditions. The order of introduction of the reactants may be varied depending on the reaction product desired and on the taste of the operator.

The reaction is usually initiated on contact of the polyhalogenated alcohol and the basic reacting compound. The reaction is, for the cases tested, exothermic. If desired, the heat liberated due to th exothermicity of the reaction may be used to effect or to aid in effecting the distillation of the halogenated epoxide from the reaction mixture. Cooling of the reaction mixture may be desirable in those cases where the object of the invention is to obtain substantial yields of an epoxide. Agitation of the reaction mixture as by mechanical stirring is, in many cases, desirable since more intimate contact of the reactants is effected and local overheating may be avoided.

The initially formed halogenated epoxide may be distilled from the reaction mixture per se or a constant boiling mixture comprising water and other vaporizable constituents of the reaction mixture depending on the vapor pressure relations existing in the system under the conditions of operation. The halogenated epoxide may be recovered from the distillate by any suitable means such as stratification, extraction, fractionation, use of drying agents, etc. The unreacted polyhalogenated alcohol, solvent, etc. which may have been carried or distilled over with the reaction product may be separated from the distillate and reutilized.

The non-halogenated or less halogenated polyhydroxy and hydroxy-carbonylic compounds may be recovered from the reaction mixture by resorting to distillation or extraction operations. In general, the reaction mixture is alkaline, due to the fact that an excess of the basic reacting compound is employed when hydration and hydrolysis of the initially formed halogenated epoxide is desired. The reaction product may be recovered from the alkaline reaction mixture or the reaction mixture may be neutralized by the addition of an equivalent amount of a suitable acid or acid reacting compound. The polyhydric halogenated or non-halogenated alcohols are conveniently recovered by distillation under subatmospheric pressures. The hydroxy-carbonylic compounds are preferably recovered by resorting to extraction operations.

We may, if desired, execute our invention in successive steps. For example, we may operate so that substantially only a halogenated epoxide is obtained. The halogenated epoxide may be isolated and then treated in the presence of water under conditions favoring its hydration and hydrolysis whereby it may be substantially completely converted to its corresponding non-halogenated hydroxy compound.

The polychlorinated alcohols containing a greater number of chlorine atoms than hydroxyl groups are particularly adaptable to use in the execution of our invention as hereinabove described.

Polyhalogenated alcohols containing a greater number of halogen atoms than hydroxyl groups may be directly converted to non-halogenated polyhydric alcohols in the presence of water and a suitable basic acting agent under conditions at which the reaction proceeds under very slightly acidic conditions. For example, we may effect the conversion in the presence of water and an excess of an alkali metal bicarbonate in a closed system. The reaction is effected at a temperature in the range of from about 100° C. to about 155° C. under a superatmospheric pressure. Under these conditions of operation the reaction proceeds with the liberation of $CO_2$. The $CO_2$ under pressure may render the reaction mixture slightly acidic. If desired, the reaction may be controlled by regulating the $CO_2$ pressure. For example, $CO_2$ under pressure may be applied.

A step by step modification of our method may be resorted to as an alternative method for the direct conversion of a suitable polyhalogenated alcohol to a non-halogenated polyhydric alcohol. For example, β-methyl glycerine may be advantageously prepared as follows: dichloro tertiary butyl alcohol is treated with an excess of a basic acting compound and converted to methyl epichlorhydrin. The basic reaction mixture is then acidified whereby substantially complete hydration of the methyl epichlorhydrin to β-methyl glycerine mono-chlorhydrin is effected. The mixture is then neutralized and a sufficient amount of a basic compound is added to effect hydrolysis of the β-methyl glycerine monochlor-hydrin to β-methyl glycidol. The β-methyl glycidol in the presence of water under the conditions of its formation is rapidly hydrated to β-methyl glycerine. By this step by step modification, β-methyl glycerine is readily prepared without resorting to the application of heat or pressure.

For purposes of illustration, reference will be had to several examples setting out preferred modes of procedure for the conversion of suitable polyhalogenated alcohols. It is to be understood that it is not our intention to limit our invention to the conditions or modes of procedure of these examples.

*Example I*

55.5 gm. (0.388 mols) of the dichloro tertiary butyl alcohol of the formula $$CH_2Cl-COH-CH_2Cl$$
$$\quad\quad |$$
$$\quad\quad CH_3$$

were slowly added to a lime slurry consisting of 120 gm. of $Ca(OH)_2$ and 300 c. c. of water. The reactants were contacted in the kettle of a fractionating apparatus equipped for effecting agitation of the reactants and removal of the reaction product by distillation under subatmospheric pressure. The kettle temperature was maintained at about 60° C. with the system under a pressure of about 135 mm. of mercury. With the system under these conditions of temperature and pressure, the reaction product was distilled from the system substantially as soon as it was formed therein.

The condensed distillate was allowed to stratify and the two liquid phases were separated. The non-aqueous phase was dried and fractionated. The main reaction product was methyl epichlorhydrin

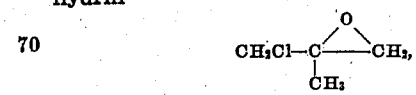

which compound boiled at 122° C. under atmospheric pressure.

The product, which is a novel compound, was obtained in a yield of about 80%. A small amount of β-methyl glycerine

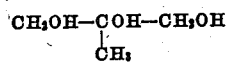

was also formed.

*Example II*

100 gm. (0.48 mols) of 2,3,4-trichloro-pentandiol-1,5($CH_2OH-CHCl-CHCl-CHCl-CH_2OH$) were slowly added to 260 c. c. of a 4N NaOH solution. The reactants were contacted in a suitable apparatus equipped with means for stirring the reaction mixture and equipped with a distillation column. During the addition of the trichloro glycol, the temperature of the reaction mixture was kept at or below about 50° C. When all of the chlorinated glycol had been added, the pressure on the system was reduced until the reaction product could be distilled from the system. The kettle temperature during the distillation was kept at or below about 60° C.

The condensed distillate was allowed to stratify and the two liquid layers were separated. The non-aqueous layer was dried and fractionated.

The main reaction product was the chlorinated diepoxide of the formula $$H_2C\overset{O}{\triangle}CH-CHCl-HC\overset{O}{\triangle}CH_2.$$

This product was obtained in a yield of about 78%.

*Example III*

200 gm. (1.40 mols) of dichloro tertiary butyl alcohol

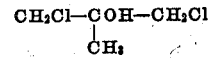

were mixed with about 600 c. c. of anhydrous ethyl ether. This mixture was placed in a reaction vessel and stirred while about 65 gm. of finely powdered NaOH were slowly added to it. The temperature of the mixture was maintained at from about 25° C. to 30° C. by suitable cooling until all of the NaOH had been added. The mixture was then stirred and heated at its boiling temperature for about 4 hours. At the end of this time the mixture was cooled, removed from the reaction vessel and the ethereal solution was separated from the concentrated aqueous NaCl solution. The ether solution was dried and the ether and reaction product were separated by a fractionation treatment.

The main reaction product, methyl epichlorhydrin, was obtained in a yield of about 90%.

*Example IV*

200 gm. (0.80 mols) of 1,3,4 trichloro-2,5 dimethyl-hexan-diol-2,5

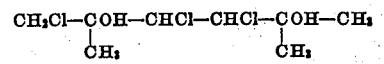

were mixed with about 600 c. c. of anhydrous ethyl ether. This mixture was stirred while about 110 gm. of dry finely powdered KOH were slowly added to it. During the contacting of the reactants, the temperature of the reaction mixture was not allowed to rise above about 50° C. When all of the KOH had been added, the mixture was stirred and heated at its boiling temperature for about 4 hours. At the end of this time, the reaction mixture was cooled, removed from the reaction vessel and the ethereal solution was separated from the aqueous KCl solution. The ether solution was dried and fractionated.

The main reaction product was a mixture of the chlorinated diepoxide of the formula

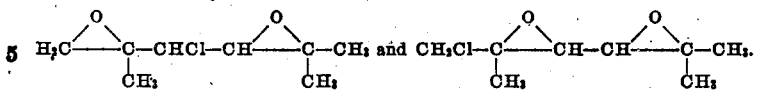

The chlorinated diepoxides were obtained in a yield of about 80%.

Example V 314 gm. (2.0 mols) of 1,4-dichloro-3-methyl-butanol-3

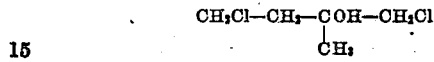

were slowly added to a slurry consisting of 64.2 gm. (1.1 mols) of $Mg(OH)_2$ and 600 c. c. of water. The reaction was effected in a reaction vessel equipped with a mechanical stirrer and in communication with a fractionating column. During the mixing of the reactants, the reaction vessel was cooled and the temperature therein was maintained at or below about 50° C. When all of the polyhalogenated alcohol had been added, the temperature of the mixture was allowed to rise to a temperature not exceeding about 75° C. The pressure on the system was decreased until the halogenated epoxide formed could be distilled from the system.

The condensed distillate was dried and fractionated. The main reaction product was the chloro-epoxide of the formula

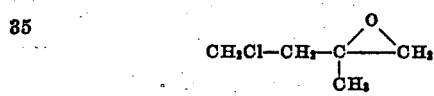

This product was obtained in a yield of about 80%.

Example VI 286 gm. (2.0 mols) of dichloro tertiary butyl alcohol

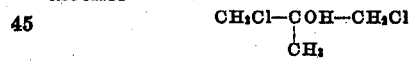

370 gm. (4.4 mols) of $NaHCO_3$ and about 2000 c. c. of water were charged to an autoclave and stirred and heated therein at a temperature of about 150° C. for about 1 hour. At the end of this time, the reaction mixture was cooled and discharged from the autoclave. The cooled reaction was acidified with HCl, boiled to remove dissolved $CO_2$ and then made neutral by the addition thereto of NaOH. The water was evaporated from the neutral reaction mixture by heating it under a subatmospheric pressure. When substantially all the water had been removed, the resulting residue comprising the reaction product and NaCl was extracted with ethyl alcohol. The alcohol extract solution was fractionated under a subatmospheric pressure.

The main reaction product was β-methyl glycerine. This compound boiled in a temperature range of from 115° C. to 120° C. at a pressure of about 1.6 mm. of mercury. The product was obtained in a yield of about 85%.

Some methyl epichlorhydrin

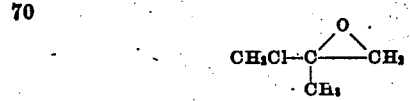

was recovered by extracting the condensed vapors evaporated from the neutral reaction mixture.

Example VII 143 gm. (1.0 mol) of dichloro tertiary butyl alcohol

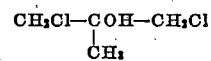

were slowly added to about 260 c. c. of a 4N NaOH solution. The reactants were contacted in a reaction vessel equipped with a mechanical stirrer and in communication with a fractionating column. During the addition of the dichloro tertiary butyl alcohol, the temperature of the reaction mixture was kept at or below about 50° C. When all of the dichloro tertiary butyl alcohol had been added, the pressure on the system was reduced until the reaction product could be distilled therefrom with the kettle temperature not exceeding about 60° C. The product could be distilled from the system at the desired rate with the reaction mixture at a temperature of about 60° C. and the system under a pressure of about 135 mm. of mercury.

The condensed distillate was allowed to stratify and the two liquid phases were separated. The non-aqueous layer was dried and fractionated. The main reaction product was methyl epichlorhydrin which was obtained in a yield of about 80%. An amount of β-methyl glycerine corresponding to a yield of about 10% was recovered from the residue.

Example VIII 231.9 gm. (2.0 mols) of 1,1 dibromo-2-methyl-propanol-2

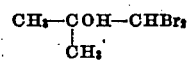

were placed in a suitable reaction vessel and 1000 c. c. of a 4N NaOH solution were added to it. This mixture was stirred and heated to about 80° C. for about one hour. At the end of this time, the cooled reaction mixture was extracted with ethyl ether.

The ether extract solution was fractionated. When all of the ether had been removed, the residue was fractionated under a subatmospheric pressure.

The main reaction product was the hydroxy-aldehyde of the formula

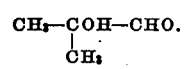

This compound was obtained in a yield of 78%.

Example IX 355.0 gm. (2.0 mols) of trichloro tertiary butyl alcohol of the formula

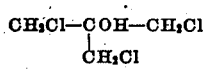

were slowly added to a lime slurry consisting of 148.2 gm. (2.0 mols) of $Ca(OH)_2$ and 500 c. c. of water. The reaction was effected in a reaction vessel equipped with a mechanical stirrer and in communication with a fractionating column. During the mixing of the reactants, the reaction vessel was cooled and the temperature therein was maintained at or below about 40° C. When all of the trichloro tertiary butyl alcohol had been added, the temperature of the mixture was allowed to rise to a temperature not exceeding about 75° C. The kettle temperature was maintained at about 75° C. and the pressure on the system was decreased until the dihalogenated epoxide formed could be distilled from the system.

The condensed distillate was dried and fractionated. The main reaction product was the dichloro epoxide of the formula

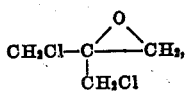

which compound is a novel composition of matter. This product was obtained in a yield of about 78%. A small amount of β-(methyl-hydroxy) glycerine was found in the residue in the reaction vessel.

143 gm. (1.0 mol) of the β-(chloro-methyl) epichlorhydrin was added to 2250 c. c. of a 1N NaOH solution. The mixture was stirred and heated to about 100° C. for about 30 minutes. The reaction mixture was then neutralized by the addition thereto of HCl. The water was evaprated from the neutral mixture under a subatmospheric pressure. When substantially all of the water had been removed, the residue consisting of the reaction product and salt was extracted with alcohol. The alcohol extract solution was dried and fractionated under a reduced pressure.

The main reaction product was the β-(methyl-hydroxy) glycerol of the formula

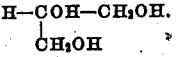

This product which is a novel compound was obtained in a yield of about 90%.

*Example X*

1600 gm. (10.2 mols) of 3,4-dichloro-2-methyl-butanol-2

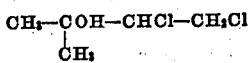

were slowly introduced into the kettle of a vacuum still containing a lime slurry consisting of 400 gm. (5.4 mols) of Ca(OH)$_2$ and 4000 c. c. of water. The reaction mixture was violently agitated; while its temperature was allowed to rise to about 65° C.; the pressure on the system was decreased to about 130 mm. of mercury. Under these conditions of temperature and pressure, the reaction product was rapidly distilled from the system as an azeotrope with water.

The condensed distillate was allowed to stratify and the two liquid phases were separated. The non-aqueous layer was dried and fractionated under a reduced pressure.

The main reaction product was β,β-dimethyl epichlorhydrin

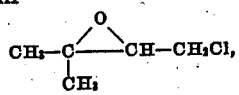

which product was obtained in a yield of 85%. A small amount of a 1,1-dimethyl glycerine

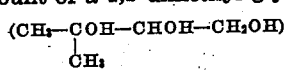

was detected in the residue.

The halogenated epoxides obtained by our method will contain at least one halogen atom and possess one or a plurality of epoxy groups depending on whether the polyhalogenated alcohol treated possesses one or a plurality of hydroxyl groups. The halogenated monoepoxides will contain at least one tertiary carbon atom which may or may not be linked to an epoxy oxygen atom. The carbon atoms contained in the halogenated polyepoxides may be of primary, secondary, tertiary or mixed character.

The halogenated polyepoxides and the chlorinated monoepoxides containing a tertiary carbon atom linked to an epoxy oxygen atom are novel compounds.

In general, we prefer to treat those polyhalogenated monohydric alcohols containing a tertiary carbon atom wherein a halogen atom is linked to a carbon atom vicinal to a carbinol group. In this case, the resulting epoxide will contain an epoxy oxygen atom linked to two vicinal carbon atoms. Another preferred class of polyhalogenated alcohols includes those containing a tertiary carbinol group which may be vicinal to or separated from a halogenated carbon atom by a tertiary carbon atom.

It is to be understood that our method is in general applicable to the treatment of polyhalogenated polyhydric alcohols and polyhalogenated monohydric alcohols containing a tertiary carbon atom, said alcohols possessing a greater number of halogen atoms than hydroxyl groups, regardless of the relative positions of said halogenated carbon atoms and hydroxyl groups. The resulting halogenated epoxides may possess an epoxy oxygen atom linked to vicinal carbon atoms or to two aliphatic carbon atoms in a series which carbon atoms may be separated from each other by primary, secondary and/or tertiary carbon atoms.

The term "epoxide" as used in this specification and the appended claims designates those organic compounds wherein an oxygen atom is linked directly to two carbon atoms of aliphatic character, which carbon atoms may be vicinal to each other or separated from each other by one or a series of carbon atoms.

The halogenated epoxides obtained by our method are valuable solvents which may be advantageously utilized for a wide variety of solvent and extraction purposes. They are particularly useful as solvents for the cellulose esters. They may be used as extractant agents in the extraction and/or purification of mineral and vegetable oils. They may also be used as intermediates in the preparation of a wide variety of useful organic compounds. For example, they may be readily converted to halogenated glycols, polyhydric alcohols, glycidols, carbonylic compounds, ethers, esters, carboxylic acids and the like. They may be reacted with ammonia, amines and the like and the corresponding nitrogen compounds obtained.

The non-halogenated polyhydric alcohols obtained by our method may be used for a wide variety of solvent purposes. They are particularly useful as intermediates in the preparation of valuable saturated and unsaturated carbonylic compounds.

While we have in the foregoing described in some detail the preferred embodiments of our invention and some variants thereof, it will be understood that this is only for the purpose of making the invention more clear and that it is not to be regarded as limited to the details of operation described, nor is it dependent on the soundness or accuracy of the theories we have advanced as to the advantageous results attained. On the other hand, the invention is to be regarded as limited only by the terms of the accompanying claims, in which it is our intention to claim all novelty inherent therein as broadly as possible in view of the prior art.

We claim as our invention:

1. A process for the conversion of a polyhalogenated tertiary alcohol to a valuable oxy compound containing fewer halogen atoms which comprises reacting an alcohol containing at least one tertiary carbinol group, a greater number of halogen atoms than hydroxyl groups and no more than two halogen atoms linked to a single carbon atom with a substantially non-oxidizing basic-acting compound at a temperature at which the desired less halogenated oxy compound is substantially stable.

2. A process for the conversion of a polyhalogenated tertiary alcohol to a valuable oxy compound containing fewer halogen atoms which comprises reacting an alcohol containing at least one tertiary carbinol group, a greater number of halogen atoms than hydroxyl groups and no more than two halogen atoms linked to a single carbon atom with a substantially non-oxidizing basic metal compound in the presence of water at a temperature at which the desired less halogenated oxy compound is substantially stable.

3. A process for the conversion of a polyhalogenated tertiary alcohol to a valuable oxy compound containing fewer halogen atoms which comprises reacting a monohydric tertiary alcohol containing at least two halogen atoms and no more than two halogen atoms linked to a single carbon atom with a substantially non-oxidizing basic-acting compound at a temperature at which the desired less halogenated oxy compound is substantially stable.

4. A process for the conversion of a polyhalogenated tertiary alcohol to a valuable oxy compound containing fewer halogen atoms which comprises reacting a monohydric tertiary alcohol containing at least two halogen atoms and not more than two halogen atoms linked to a single carbon atom with a substantially non-oxidizing basic metal compound in the presence of a substantial amount of water at a temperature at which the desired less halogenated oxy compound is substantially stable.

5. A process for the conversion of a polyhalogenated tertiary alcohol to a halogenated epoxide which comprises reacting a monohydric tertiary alcohol containing at least two halogen atoms and not more than two halogen atoms linked to a single carbon atom with a substantially non-oxidizing basic metal compound at a temperature below about 100° C.

6. A process for the conversion of a polyhalogenated tertiary alcohol to a halogenated epoxide which comprises reacting a monohydric tertiary alcohol containing at least two halogen atoms and not more than two halogen atoms linked to a single carbon atom with a substantially non-oxidizing basic metal compound in the presence of water at an elevated temperature below about 100° C., and removing the halogenated epoxide from the reaction mixture substantially as soon as it is formed therein.

7. A process for the conversion of a polyhalogenated tertiary alcohol to a halogenated epoxide which comprises reacting a monohydric tertiary alcohol containing at least two halogen atoms and possessing a monohalogenated carbon atom linked to the tertiary carbinol group with a substantially non-oxidizing basic metal compound at a temperature below about 100° C.

8. A process for the conversion of a polyhalogenated tertiary alcohol to an hydroxy compound containing fewer halogen atoms which comprises reacting a polyhalogenated monohydric tertiary alcohol possessing no more than two halogen atoms linked to a single carbon atom with a basic-acting compound in the presence of water at a temperature above about 100° C.

9. A process for the conversion of a polyhalogenated tertiary alcohol to an hydroxy compound containing fewer halogen atoms which comprises reacting a polyhalogenated monohydric tertiary alcohol possessing no more than two halogen atoms linked to a single carbon atom with a basic metal compound in the presence of a substantial amount of water at a temperature of from about 100° C. to about 150° C.

10. A process for the conversion of a polyhalogenated tertiary alcohol to an hydroxy compound containing fewer halogen atoms which comprises reacting a polyhalogenated monohydric tertiary alcohol possessing a monohalogenated carbon atom linked to the carbinol group with a basic metal compound in the presence of a substantial amount of water at a temperature of from about 100° C. to about 150° C.

11. A process for the conversion of a polyhalogenated tertiary alcohol to an hydroxy compound containing fewer halogen atoms which comprises reacting a polyhalogenated monohydric tertiary alcohol with a substantially non-oxidizing basic metal compound at a temperature below 100° C. whereby it is converted to the corresponding halogenated epoxide, separating the resulting halogenated epoxide and effecting its conversion to a polyhydric alcohol in the presence of water and a basic-acting compound.

12. In a process for the conversion of a polyhalogenated tertiary alcohol to an hydroxy compound containing fewer halogen atoms, the steps of converting a halogenated epoxide to a polyhydric tertiary alcohol by treatment with water in the presence of a basic-acting agent and recovering the polyhydric alcohol.

13. In a process for the conversion of a polyhalogenated tertiary alcohol to an hydroxy compound, the steps of treating a halogenated epoxide wherein a halogen atom is linked to a carbon atom not embraced in an epoxy group with a sufficient quantity of a basic metal compound and water to yield a non-halogenated polyhydric alcohol and recovering said alcohol.

14. A process for the conversion of a compound of the formula

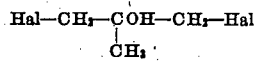

to an epoxide of the formula

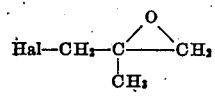

which comprises reacting such a polyhalogenated tertiary alcohol with a basic metal compound at a temperature below about 100° C.

15. A process for the conversion of a compound of the formula

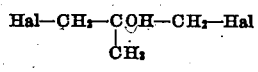

to the non-halogenated alcohol

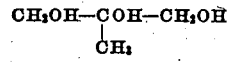

which comprises reacting such a polyhalogenated tertiary alcohol with a basic metal compound in the presence of a substantial amount of water at a temperature of from about 100° C. to about 150° C.

16. A process for the conversion of the dichloro tertiary butyl alcohol of the formula $$CH_2Cl-\underset{\underset{CH_3}{|}}{C}OH-CH_2Cl$$

to β-methyl epichlorhydrin which comprises reacting the dichloro tertiary butyl alcohol with a basic metal hydroxide at a temperature below 100° C.

17. A process for the conversion of the dichloro tertiary butyl alcohol of the formula $$CH_2Cl-\underset{\underset{CH_3}{|}}{C}OH-CH_2Cl$$

to β-methyl glycerine which comprises reacting the dichloro tertiary butyl alcohol with a basic metal hydroxide in the presence of a substantial amount of water at a temperature of from about 100° C. to about 150° C.

18. A halogenated epoxide which contains at least one tertiary carbon atom and at least one epoxy oxygen atom linked to two aliphatic carbon atoms each of which is linked to at least one hydrogen atom.

19. A halogenated epoxide which contains at least one tertiary carbon atom and at least one epoxy oxygen atom linked to two carbon atoms of aliphatic character, at least one of which is linked to a halogen atom.

20. A chlorinated epoxide which contains at least one tertiary carbon atom and at least one epoxy oxygen atom linked to two vicinal carbon atoms of aliphatic character, at least one of which is linked to a chlorine atom.

21. A halogenated epoxide of the formula $$Hal-CH_2-\underset{\underset{x}{|}}{C}\overset{O}{\overbrace{\phantom{xx}}}CH_3$$

wherein $x$ represents a hydrocarbon radical containing at least two carbon atoms.

22. A halogenated epoxide containing at least five carbon atoms to the molecule and an epoxy oxygen atom linked to two aliphatic carbon atoms at least one of which is tertiary.

HERBERT P. A. GROLL.
GEORGE HEARNE.